Jan. 2, 1923. 1,440,780
A. B. HULSEBOS ET AL.
PLOW SAFETY HITCH.
FILED APR. 29, 1921. 2 SHEETS-SHEET 1

Albert B. Hulsebos & Gerrit Den Beste, Inventors
By their Attorneys Dodson & Roe Jan. 2, 1923.
1,440,780

A. B. HULSEBOS ET AL.
PLOW SAFETY HITCH.
FILED APR. 29, 1921.

Albert B. Hulsebos
and
Gerrit Den Besten,
Inventors

By their Attorneys Dodson & Ra

Patented Jan. 2, 1923.

1,440,780

UNITED STATES PATENT OFFICE.

ALBERT B. HULSEBOS AND GERRIT DEN BESTEN, OF HOLLAND, MICHIGAN, ASSIGNORS TO SAFETY RELEASE CLEVIS CO., OF HOLLAND, MICHIGAN, A CORPORATION OF MICHIGAN.

PLOW SAFETY HITCH.

Application filed April 29, 1921. Serial No. 465,444.

*To all whom it may concern:*

Be it known that we, ALBERT B. HULSEBOS and GERRIT DEN BESTEN, citizens of the United States, residing at Holland, county of Ottawa, and State of Michigan, have invented certain new and useful Improvements in Plow Safety Hitches, of which the following is a specification.

Our invention relates to that class of devices which are designed to connect a source of power such as a tractor or horses to a plow or other agricultural implement, and which is described in my co-pending application Serial No. 433,974, in which device the hook which connects the clevis of the tractor or plow is engaged by a latch and when the plow strikes a stone or a stump or similar obstruction, the latch which holds the hook yields, being held in place by a spring, and the hook is released.

In the said application means are provided to hold the latch in position for re-engagement but no means are provided to ease the friction between the arm of the hook and the latch, and this friction is considerable.

Our present invention has for its object to provide means which will not only hold the latch in position for re-engagement, but which will materially expedite the movement of the latch in the releasing of the arm of the hook, thereby greatly decreasing the friction caused by the engagement of the hook arm with the latch.

Our means of accomplishing the foregoing objects may be more readily understood by having reference to the accompanying drawings which are hereunto annexed and are a part of this specification, in which—

Fig. 1 is a top or plan view of our improvement.

Figure 1:
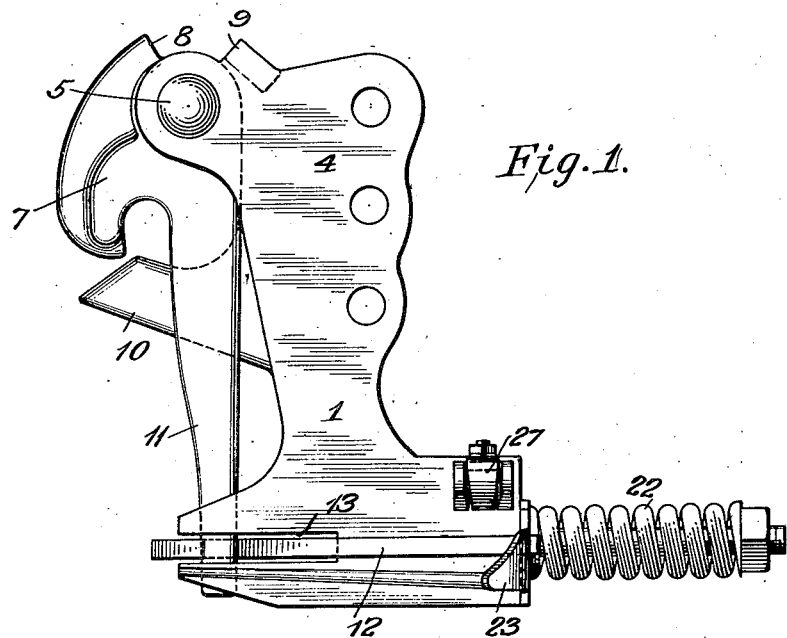
Figure 2:
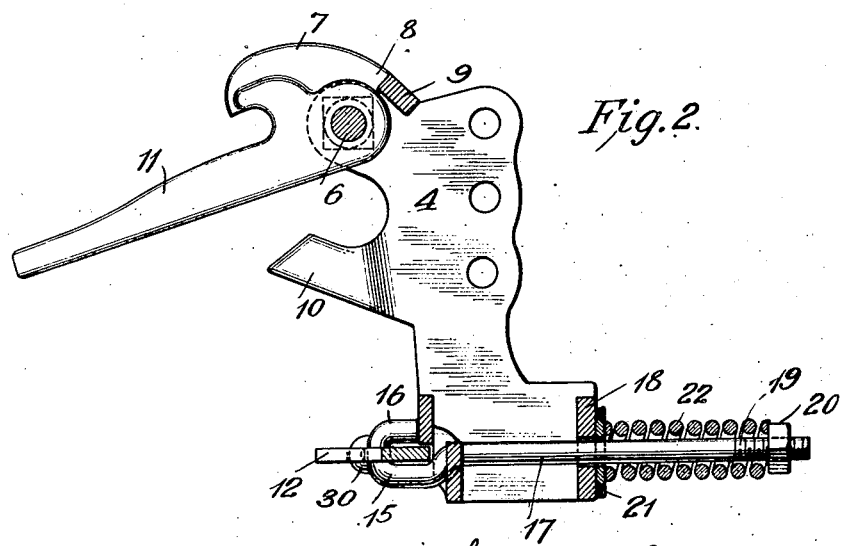
Fig. 2 is a section taken on the line 2—2 in Fig. 4.
Figure 3:
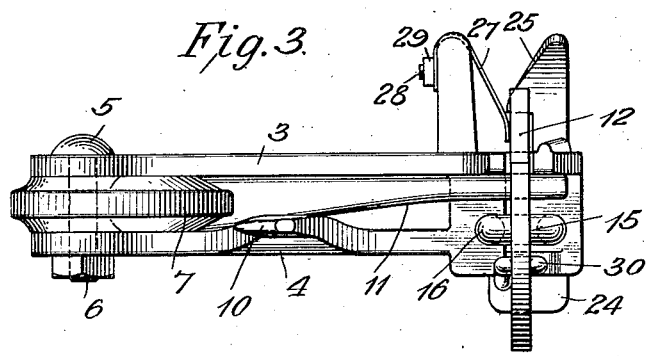
Fig. 3 is a front end elevation.
Figure 4:
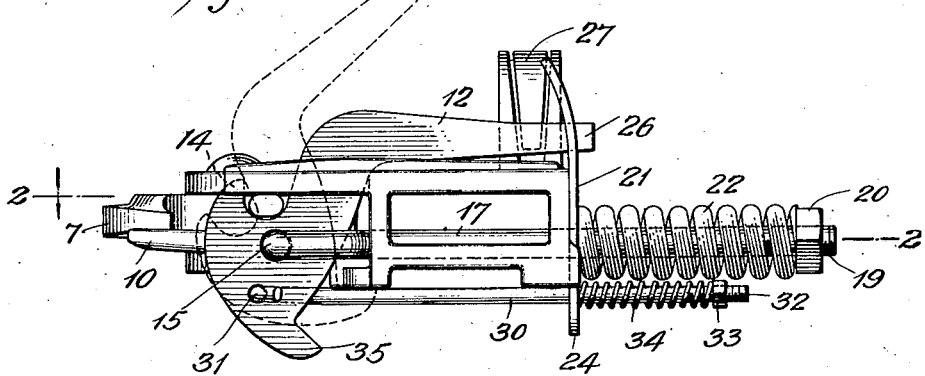

Fig. 4 is a side elevation of our improvement, the position of the latch being indicated in dotted lines when the hook has been released.

Figure 5:
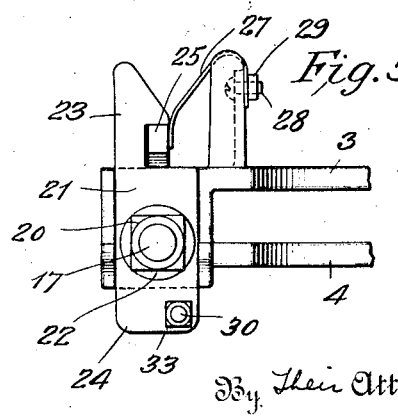

Fig. 5 is a fragmentary detail view.

Similar reference numerals refer to similar parts throughout the entire description.

As shown in the drawings, the device comprises a main body portion 1 which is formed with two laterally extending arms 3 and 4 which are in spaced relation to each other. A bolt 5 is mounted in one end of the arm and extends through, being held in position by means of a nut 6. This bolt forms a pivot upon which swings the hook 7 which is adapted to engage the clevis of the tractor (not shown).

The hook 7 is provided with a stop 8 which is adapted to engage a shoulder 9 cast or formed upon the main body portion. This stop serves to prevent the hook swinging so far that it could not easily be re-engaged for the purpose of recoupling the device. The arm 4 is provided with an outwardly extending lug 10 which is adapted to insure the arm 11 of the hook 7 swinging back into the correct position to engage the latch 12. The latch 12 is mounted in a slot 13 formed in the other end of the body portion 1 and is provided with a detent 14 which engages the arm 11 of the hook 7.

In practice it is found desirable to have the walls of the slot 13 diverge slightly at their outer end to insure the latch entering freely therein after the hook has been released and when the hitch is to be re-engaged.

The latch 12 swings upon a pivot 15 which is a portion of a hook 16 on the end of a bolt 17 which is mounted and slidable in a wall 18 which connects the body portion 1 at one of its extremities. This bolt is provided with a threaded portion 19 at its outer end upon which is mounted a nut 20. Intermediate the nut 20 and a plate 21, we mount a coil spring 22. Inasmuch as the latch 12 is carried by the bolt 17, it follows that the spring 22 regulates the amount of pull required to permit the hook 7 to open and release the tractor, as the hook is held in position by the engagement of the arm 11 with the detent 14.

The plate 21, as clearly seen in Fig. 5, comprises an upwardly extending portion 23 and a downwardly extending portion 24. The upwardly extending portion 23 is formed with a hook 25 which is adapted to engage the end 26 of the latch 12. A flat spring 27 is mounted upon the arm 3, being held in position by a bolt 28 and nut 29, or in any other suitable or convenient manner. This spring serves to push the latch into engagement with the hook 25 when the device is to be recoupled.

The downwardly extending portion or lug 24 of the plate 21 has an opening therein through which extends a bolt 30. This bolt 30 is provided with a hook 31 at one end which engages the latch 12 below its pivotal point. The other end of the bolt 30 is provided with a threaded portion 32 upon which is mounted a nut 33. A coil spring 34 is mounted intermediate the nut and the downwardly depending lug 24. This spring serves to regulate the tension or pull exerted upon the latch 12 through the medium of the hook 31. A detent 35 is formed upon the lower end of the latch 12 so as to prevent its swinging beyond the proper position in which the device can be re-engaged or re-coupled.

It will be apparent from the foregoing description that when the pull on the hook 7 exceeds the tension of the spring 22, that the latch 12 will move forwardly until its end 26 passes out of engagement with the hook 25, when the latch will fly into the position shown in dotted lines in Fig. 4.

As previously stated, this operation would be attendant with considerable friction at the point of engagement of the arm 11 with the detent 14 of the latch 12. We expedite this movement and relieve the friction to a great extent by means of the spring 34 on the bolt 30, as it exerts a constant tension which can be increased to any desired point, tending to pull the hook upwardly and into the position shown in dotted lines. The result is that the release of engagement between the arm 11 and the detent 14 is greatly expedited in this manner. The spring also serves to hold the latch 12 in the correct position for re-engagement or recoupling after the release has taken place. Practice has shown that this construction tends to materially increase the efficiency of the device.

Having described our invention what we regard as new and desire to secure by Letters Patent is:

1. An automatic release comprising a main body portion, a hook pivotally attached thereto, spring actuated means to hold said hook in a closed position, which means releases at a predetermined pull, a hook bolt which engages said holding means below its pivot, a downwardly depending lug having an opening through which said bolt extends, a nut threaded on said bolt, and a coil spring mounted intermediate said nut and said lug, for the purpose set forth substantially as described.

2. An automatic release for plows comprising a body portion having two arms, a plow beam being bolted intermediate said arms, a pivot in said casting, a hook mounted thereon adjacent the ends of said arm, said beam and hook being in line, an arm on said hook, a latch engaged by said arm, a spring which holds said latch normally closed, a pivot for said latch at right angles to the first pivot, means to prevent the tightening of the tension of said spring from pulling the latch pivot back, a hook bolt which engages said latch below said pivot, a downwardly depending lug having an opening through which said bolt extends, a nut threaded on said bolt, and a coil spring intermediate said nut and said lug.

3. An automatic release comprising a main casting having two arms, a hook pivotally attached adjacent one end and intermediate said arms, an arm formed on said hook extending therefrom at right angles to said pivot, there being a slot in said casting adjacent its other end, a latch which swings in said slot, a bolt slidably mounted in said casting, a loop on said bolt which forms a pivot for said latch, the axis of said pivot being at right angles to the first-named pivot, a spring on said bolt, a nut to regulate its tension, a catch mounted intermediate the inner end of said spring and the casting, which catch engages the end of said latch when the hook arm is held thereby, a hook bolt which engages said latch below said pivot, an extension on the lower end of said catch having an opening through which said bolt extends, a nut threaded on said bolt, and a coil spring intermediate said nut and said extension.

In testimony whereof, we have signed the foregoing specification.

ALBERT B. HULSEBOS.
GERRIT DEN BESTEN.